(12) United States Patent
Kemp et al.

(10) Patent No.: US 7,868,239 B2
(45) Date of Patent: Jan. 11, 2011

(54) METHOD AND DEVICE FOR PROVIDING AN OVERVIEW OF PIECES OF MUSIC

(75) Inventors: Thomas Kemp, Esslingen (DE); Wilhelm Hagg, Korb (DE); Jana Eggink, Stuttgart (DE)

(73) Assignee: Sony Corporation, Tokyo (JP)

( * ) Notice: Subject to any disclaimer, the term of this patent is extended or adjusted under 35 U.S.C. 154(b) by 100 days.

(21) Appl. No.: 12/205,201

(22) Filed: Sep. 5, 2008

(65) Prior Publication Data

US 2009/0084249 A1    Apr. 2, 2009

(30) Foreign Application Priority Data

Sep. 28, 2007    (EP) ................... 07019202

(51) Int. Cl.
*G10H 1/00* (2006.01)
(52) U.S. Cl. .............. 84/612; 84/636; 84/652; 84/668
(58) Field of Classification Search .......... 84/600–602, 84/612, 636, 652, 668
See application file for complete search history.

(56) References Cited

U.S. PATENT DOCUMENTS

| | | | | |
|---|---|---|---|---|
| 7,189,913 | B2 * | 3/2007 | Moulios et al. ............... | 84/612 |
| 7,208,672 | B2 * | 4/2007 | Camiel ......................... | 84/625 |
| 7,304,231 | B2 * | 12/2007 | van Pinxteren et al. ....... | 84/615 |
| 7,345,233 | B2 * | 3/2008 | van Pinxteren et al. ....... | 84/615 |
| 7,592,534 | B2 * | 9/2009 | Yoshikawa et al. ............ | 84/612 |
| 2003/0065517 | A1 * | 4/2003 | Miyashita et al. ........... | 704/278 |
| 2003/0089218 | A1 | 5/2003 | Gang et al. | |
| 2003/0205124 | A1 * | 11/2003 | Foote et al. ................... | 84/608 |
| 2004/0159221 | A1 * | 8/2004 | Camiel ......................... | 84/660 |
| 2004/0254660 | A1 * | 12/2004 | Seefeldt ....................... | 700/94 |
| 2005/0211072 | A1 * | 9/2005 | Lu et al. ....................... | 84/612 |
| 2006/0048634 | A1 * | 3/2006 | Lu et al. ....................... | 84/612 |
| 2006/0107822 | A1 * | 5/2006 | Bowen ......................... | 84/612 |
| 2006/0224260 | A1 | 10/2006 | Hicken et al. | |
| 2007/0074618 | A1 * | 4/2007 | Vergo ........................... | 84/612 |
| 2007/0113724 | A1 * | 5/2007 | Kim et al. ..................... | 84/609 |
| 2008/0022846 | A1 * | 1/2008 | Samadani et al. ............. | 84/610 |
| 2008/0097633 | A1 * | 4/2008 | Jochelson et al. ............. | 700/94 |
| 2008/0249982 | A1 * | 10/2008 | Lakowske ..................... | 707/3 |
| 2009/0139389 | A1 * | 6/2009 | Bowen ......................... | 84/636 |
| 2009/0178542 | A1 * | 7/2009 | Jochelson et al. ............. | 84/609 |

FOREIGN PATENT DOCUMENTS

WO    WO 2007/105180 A2    9/2007

OTHER PUBLICATIONS

U.S. Appl. No. 12/255,221, filed Oct. 21, 2008, Eggink.
U.S. Appl. No. 12/369,352, filed Feb. 11, 2009, Kemp.

(Continued)

*Primary Examiner*—David S. Warren
(74) *Attorney, Agent, or Firm*—Oblon, Spivak, McClelland, Maier & Neustadt, L.L.P.

(57) ABSTRACT

Method for providing an overview of pieces of music, comprising: providing at least two pieces of music; determining at least two sections of said pieces of music, wherein one of said sections is determined from one of said pieces of music and another of said sections is determined from another of said pieces of music; and arranging said sections in a sequence.

20 Claims, 8 Drawing Sheets

OTHER PUBLICATIONS

Robert Neumayer, et al., "Content-Based Organization of Digital Audio Collections", Internet Citation, [Online}, XP002447548, Retrieved from the Internet: URL:http://www.ifs.tuwien.ac.at/andi/publications/pdf/neu_musicnetwork05.pd>[retrieved on Aug. 20, 2007], 11 pages.

U.S. Appl. No. 12/593,927, filed Sep. 30, 2009, Kemp.

* cited by examiner

METHOD AND DEVICE FOR PROVIDING AN OVERVIEW OF PIECES OF MUSIC

An embodiment of the invention relates to a method and device for providing an overview of pieces of music. A further embodiment of the invention relates to a system for providing an overview of pieces of music.

BACKGROUND

Finding pieces of music in large music data bases has become a challenging task, e.g. since recent technologies such as audio compression permit the assembly of large music collections comprising several thousands or millions of songs.

Moreover, large music databases exist and may be accessed e.g. via internet. Browsing such a big collection is often time consuming and painful for the user.

It is, therefore, an object of the invention to provide a method and device for providing an overview of pieces of music.

This object is solved by a method and device according to claims 1, 16, 18, 19, and 20, respectively.

Further objects and possible advantages of the invention will become apparent from a consideration of the drawings and ensuing description.

DETAILED DESCRIPTION

In the following, embodiments of the invention are described. It is important to note, that all embodiments described in the following may be combined in any way, i.e. there is no limitation that certain described embodiments may not be combined with others.

In an embodiment of the invention, a method for providing an overview of pieces of music comprises providing at least two pieces of music, determining at least two sections of said pieces of music, wherein one of said sections is determined from one of said pieces of music and another of said sections is determined from another of said pieces of music, and arranging said sections in a sequence. The overview may be provided by a medley comprising the sequence.

Said pieces of music may be determined from any collection comprising music data, e.g. a directory, a folder, or any other container comprising music data. Said pieces of music may also be retrieved from a collection such as a data base, e.g. by making use of playlists, determining an ordered list of pieces of music, music mood selectors, providing access to an arrangement of content items of the same mood, or artist selectors, allowing the selection of pieces of music composed or performed by a selected artist, and the like. Moreover, said pieces of music may be received from remotely located data bases, e.g. via internet or via a local network in the user's environment. Besides music data, said collection may comprise other content items e.g. for user entertainment, such as, for example, video data or computer games. In the latter case, music from audio data tracks may be derived from said content items.

When determining said sections from said pieces of music, one section may be determined from one piece of music and another section may be determined from another piece of music. Consequently, sections from at least two of said pieces of music may be determined. In other words, said overview may comprise sections originating from at least two of said pieces of music. Hence, it may be regarded as a summary, reflecting the content of said collection or of a part of it.

Further, it may be possible to determine at least one section of each of said pieces of music. Alternatively, for generating a short summary, at most one section may be determined from each of said pieces of music. This enables the listener to get a quick overview, e.g. of the most relevant items of said collection.

Determination of sections may depend on the purpose underlying the generation of said overview. Typical sections may be of special interest for summarizing a collection of music pieces. Thus, representative parts of a respective piece of music may be derived, such as a chorus, a refrain, and/or a singing voice. Sections may also be determined as to representatively summarize a piece of music, e.g. if said piece of music comprises passages that may be regarded as calm and other passages that may be regarded as energetic, sections from both passages may be determined/selected.

The arrangement of sections in a sequence may also depend on the purpose the overview is generated for. For example, said sections may be arranged in said sequence reflecting the order of an ordered list of said pieces of music, e.g. a playlist. This results in an overview of content and order of music pieces comprised in the collection. Alternatively, sections may be arranged in a random sequence. This results in a randomization, ensuring that the same sequence is not generated repeatedly, e.g. on subsequent browsing of or visits to the same directory or folder. Moreover, further options for arranging said sections may be of interest. For quickly catching the user's attention, it may be suitable to arrange sections originating from the best known pieces of music in the collection at the beginning of the sequence. If, for example, said music collection comprises pop songs, said best known pieces of music may be the songs placed on top of the actual hit lists which may e.g. be downloaded automatically from the internet. If, in another example, said music collection reflects the soundtrack of a film, said best known pieces of music may comprise the introductory theme. If, in yet another example, said collection comprises songs from another decade, e.g. the seventies, songs that may be regarded as evergreens can be placed at the beginning of the overview. Another criterion for arrangement may be the type of a section. For instance, sections with a singing voice may be arranged at the beginning of the sequence, and may be followed by those sections comprising the refrain. Further, tempi may be considered when arranging sections, e.g. sections may be arranged such that rhythms or paces of successive sections match with each other or lead to a rhythmically interesting effect.

Another important issue when arranging said sections may be the diversity of the music pieces and/or sections. In order to get a quick overview of the collection, sections from the most diverse pieces of music may be selected. Moreover, it may be possible to select sections without regarding the diversity of pieces of music, but to put the sections originating from the most diverse pieces of music at the beginning of the overview. Yet another way of reflecting the diversity of the music pieces and/or sections in the overview is to determine the diversity of the selected sections and to place the most diverse sections at the beginning. Various ways of determining the diversity of pieces of music and/or sections and of considering it in the arrangement will be discussed below.

In order to achieve a smooth transition between the sections arranged in said sequence, a fading procedure may be applied. This may be a fade in at the beginning of the sequence, a fade out at the end of the sequence and/or a cross fading with respect to the signals of two successive sections in the sequence. This fading may also comprise a modulation between keys of said successive sections, e.g. by a cadence. Said modulation may also be performed by combining at least parts of melodies or by combining at least parts of rhythms of said successive sections. In the latter case, combination of rhythms may lead to an assimilation of tempi between the sections, e.g. speeds or paces of the respective sections that may, for example, be measured in beats per minute.

An overview generated in accordance with the described embodiments of the invention allows a user to conveniently browse large music collections, since it may provide an abbreviated, non-visual impression of the underlying music data. The overview may be provided by a medley combining tunes or passages from various sources.

For facilitating browsing, an overview may be generated for a multitude of containers comprising music data, such as directories, folders, playlists, music mood selectors, or artist selectors. This allows giving or getting a quick overview of such a container, e.g. when a user desires to present a newly assorted playlist to a friend or to explore music of a newly acquainted artist, getting a first overview of the related works.

A medley may be pre-calculated in order to improve performance during browsing. Once pre-calculated, the medley may be stored together with said container, and may be retrieved from data storage and played to a user when he/she selects or enters said container.

Alternatively, a medley may be generated before playing it to a user, e.g. when the user selects a container or enters a directory. This way of generating the medley may be regarded as "on the fly" or "on demand" composition. It allows randomization of results, and ensures that the same sequence is not repeated on a subsequent visit of the user to the same container or directory.

Figure 1:
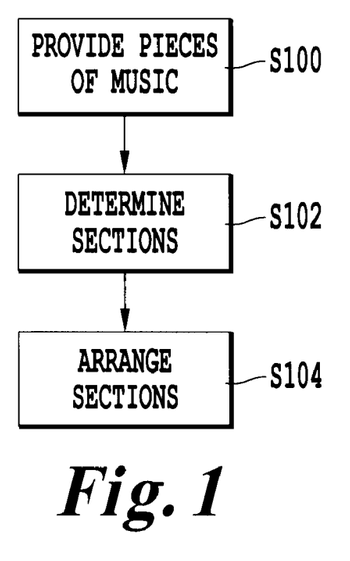
FIG. 1 shows an embodiment of a method for providing an overview of pieces of music.

In FIG. 1, a step of providing pieces of music S100 is shown, wherein at least two pieces of music may be determined from a collection comprising music data or may alternatively be received from a remote data storage, e.g. via internet. Further, a step of determining sections S102 is shown, in which at least two sections may be determined in such a way that one of said sections originates from one of said pieces of music and another of said sections originates from another of said pieces of music. This is followed by a step of arranging sections S104, wherein said sections are arranged in a sequence. The sequence may be played to a user, thus providing an overview of the collection.

Thus, according to the embodiment of FIG. 1, it may be possible to generate an overview, comprising at least two sections originating from at least two pieces of music. This overview may be generated for different purposes, e.g. for summarizing the content of a directory, for giving a quick impression of the content of a playlist, music mood selector, or artist selector the user possibly plans to listen to, or of pleasantly attracting the user's attention to a bundle comprising music data which might be interesting for him to buy.

Figure 2:
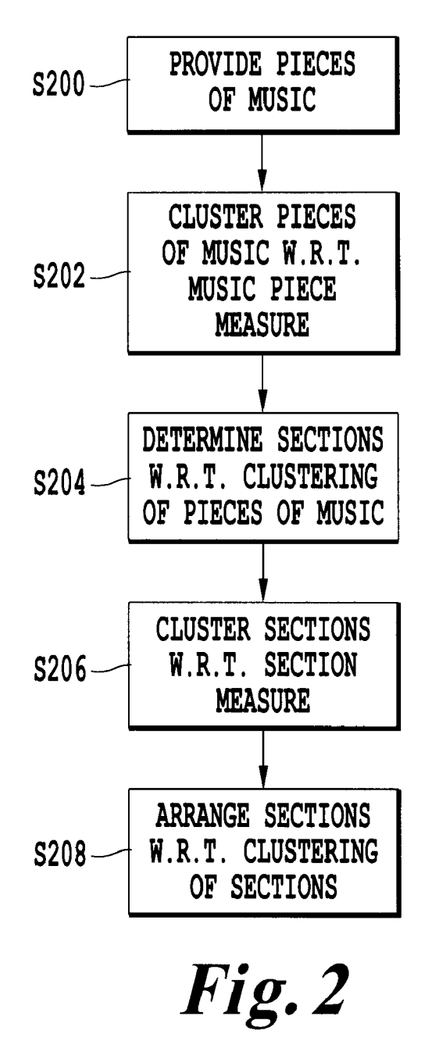
FIG. 2 shows a further embodiment of a method for providing an overview of pieces of music.

FIG. 2 shows a further embodiment on the invention, wherein pieces of music are provided by a providing step S200. As discussed above, this provision may comprise determination of said pieces of music from a music data collection or reception of music data from a possibly remotely located data storage.

Then, in a following music piece clustering step S202, said pieces of music may be clustered depending on a music piece measure. Said music piece measure may be descriptive of at least one property of a respective piece of music. The music piece measure may be represented numerically or indicated by categories, and may be restricted to one dimension or may, alternatively, comprise a multidimensional representation. Said property reflected by said music piece measure may concern a character or a peculiarity of said piece of music, or may be related to an attribute such as a musical style, a period in time, a composer, or a performing artist. It may be an audible property, perceptible by the user when listening to said piece of music. Alternatively or in addition, said music piece measure may be determined from the signal spectrum of said piece of music, e.g. by calculating the Mel Frequency Cepstral Coefficients (MFCC).

In said music piece clustering step S202, said music piece measure may be used for determining a distance between said pieces of music. For this purpose, one of the known distance measures may be used, e.g. an Euclidian distance or a Mahalanobis distance. Based on said distance measure, said pieces of music may be clustered in music piece clusters. A hierarchical or a partitional clustering algorithm may be used for this purpose.

The following section determination step S204 may then relate to said music piece clustering. For example, from each music piece cluster at least one section may be determined, ensuring that essentially each music piece cluster be represented in said medley. Furthermore, sections from pieces of music in a vicinity of a centroid of a music piece cluster may be selected, thus achieving a selection of sections that may be considered as being representative of said music piece cluster. This way of selecting sections considered as being representative will be described in detail here-below.

In a further embodiment, a size of each of said music piece clusters may be determined, for example by counting the number of music pieces belonging to a respective music piece cluster or by summing the respective playing time of each of the pieces of music comprised in a respective music piece cluster. In said section determination step S204, said sections may in this case be determined depending on said size. For example, sections may be determined such that in said sequence, the amount of time assigned to sections originating from pieces of music of a respective music piece cluster corresponds to its size. It may, e.g., be possible to determine a percentage of total playing time contributed by pieces of music of a respective music piece cluster. Then, in the section determination step S204, sections of pieces of music of said respective music piece cluster may be selected with an amount of playing time corresponding to said percentage, this time related to the intended or predetermined playing time of the overview. For example, if a music piece cluster comprises music pieces contributing about 30% of the total playing time, and a medley with a total length of 100 seconds is to be generated, then sections originating from that music piece cluster may be selected with an amount of playing time of approximately 30 seconds. This may result in a balanced representation of the musical styles comprised in a collection: If, for example, a playlist comprises happy songs with a total playing time of 35 minutes and sad songs with a total playing time of 15 minutes, then sections may be determined from the happy songs with a total amount of playing time of 35 seconds and sections from the sad songs with total amount of playing time of 15 seconds. Hence, the medley may reflect this balance of sad and happy songs, and the user may get a quick impression of this balance.

Following the section determination step S204, a section clustering step S206 is shown in FIG. 2. As a basis for section clustering, a section measure is determined. Said section measure may describe at least one property of a respective section. The representation of the section measure may be numerical or indicated by categories, and may be one- or multidimensional. The section measure may refer to a character, a peculiarity, or an attribute of said section, such as a musical style, a period in time, a composer, or a performing artist. Said section measure may also reflect further audible properties, perceptible by a listener when listening to said section. Furthermore, said section measure may be determined from the signal spectrum of a respective section, e.g. by evaluating the Mel Frequency Cepstral Coefficients. In particular, said section measure may also depend on said music piece measure of the respective piece of music said section originates from. For example, said music piece measure may be incorporated in said section measure by one or more components of a multidimensional representation. The section measure, in the following, may be referred to as first measure, while the music piece measure may be referred to as second measure.

Said section measure may be used for calculating a distance between sections, e.g. by calculating the Euclidian distance or the Mahalanobis distance. Said distance between sections may then be used as a basis for clustering said sections in the section clustering step S206, for example with a hierarchical or partitional clustering algorithm.

The arrangement of sections may in this case be performed with respect to said clustering of sections, as it is shown in the section arranging step S208 in FIG. 2. The way of arranging said section may depend on the purpose the medley is generated for.

If, for example, the medley is generated to provide a fast overview on the content of a directory or folder, it may be appropriate to perform an arrangement by diversity, putting the most diverse sections at the beginning of said medley. This may be achieved by selecting sections having a highest difference in distance and arranging them at the beginning of said sequence. In the following of the sequence, sections with a decreasing distance may be arranged. Alternatively or in addition, when arranging sections, it may also be considered to which section cluster a section belongs to. To make sure that the listener gets a fast overview on all of the comprised section clusters, one section from each cluster may be placed at the beginning of the medley.

The described arrangement by diversity may or may not be appropriate for generating said medley, depending on the purpose the medley is generated for. On the one hand, it ensures that the listener may get a fast overview of the content of the collection the medley may represent. On the other hand, it could be annoying for the listener if the medley jumps between very diverse sections. Thus, for generating a medley pleasant to listen to, but at the same time reflecting the diversity of a music collection, it may be appropriate in the section arranging step S208 to divide said sequence in subsequences of one or more sections belonging to the same cluster. In other words, the sequence may be constructed by concatenating subsequences of sections originating from the same section cluster and/or music piece cluster. This results in grouping a small number of similar sections in a subsequence that might be pleasant to hear for a listener, while the diversity of the directory is represented by the sequence as a whole.

Further criteria for the arrangement of sections in the section arranging step S208 may be used. For example, sections with a singing voice may be preferred to those containing a refrain, and may be grouped to a subsequence at the beginning of the medley. Then, following this first subsequence, a second subsequence comprising the sections containing the refrain may follow. Alternatively, sections with singing voice and refrain from one single piece of music may be grouped in a subsequence, such that the subsequences form a short summary of a respective piece of music.

Depending on the section measure used as a basis for said section clustering, varying results may be achieved by this way of arranging sections in subsequences and concatenating subsequences to a single sequence. For example, the sections may be grouped depending on their musical type. The arrangement may then reflect the distribution of musical types of a folder or directory. If, for example, a folder holds may romantic and only a few aggressive songs, the medley may start with multiple romantic sections followed by one or two aggressive sections, followed by some more romantic sections and so on.

In a further embodiment, it is possible to arrange said sections depending on a respective cluster to which a piece of music belongs to from which said section is extracted. This may permit to select sections originating from music pieces that may be regarded as being representative for a whole music piece cluster, and to place them at the beginning. An arrangement by diversity as described here-above allows arranging sections from the most diverse pieces of music and/or from different music piece clusters at the beginning, making sure that the listener gets a fast overview essentially of all of the existing music piece clusters. Furthermore, said music piece clustering may be considered when said subsequences of said sections are built and concatenated in said sequence. Accordingly, an arrangement of sections may be achieved, comprising subsequences of sections from a same music piece cluster.

Figure 3:
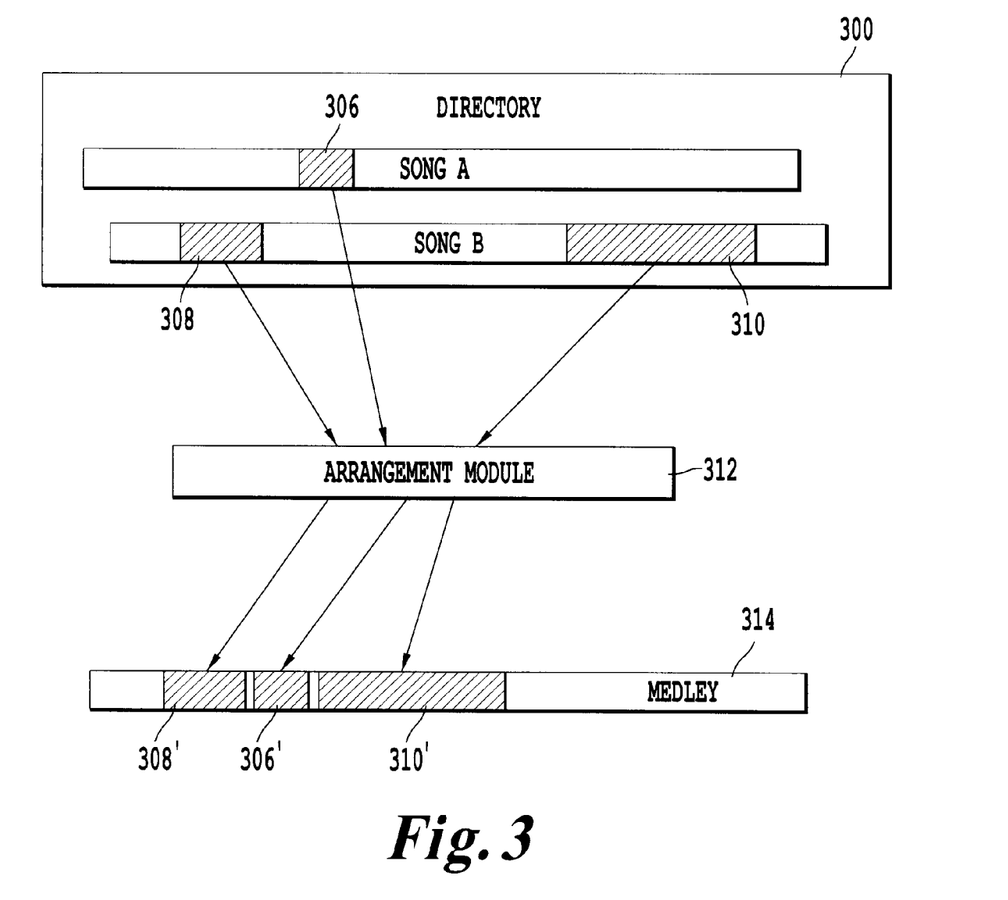
FIG. 3 shows an embodiment of the invention, wherein songs from a directory are arranged in a medley.

FIG. 3 shows an embodiment of the invention, wherein a directory 300 holds a song A and a song B. As an example, without any limitation to the case, from song A a first section 306 is selected. Further, from song B, a second section 308 and a third section 310 are selected. These sections are arranged by an arrangement module 312, that may perform an arrangement according to the criteria discussed here-above. The resulting medley 314 then consists of a sequence of the arranged sections. In the example, the sequence comprises a processed section placed firstly 308', a processed section placed secondly 306', and a processed section placed thirdly 310'. As indicated by the length in the example, the processed section placed firstly 308' may have been derived from second section 308, e.g. by applying a fading procedure, the processed section placed secondly 306' may have been derived from first section 306 as well as the processed section placed thirdly 310' from third section 310. It is also possible that section 308 is equal or essentially equal to section 308', section 306 is equal or essentially equal to section 306' and so on.

Figure 4:
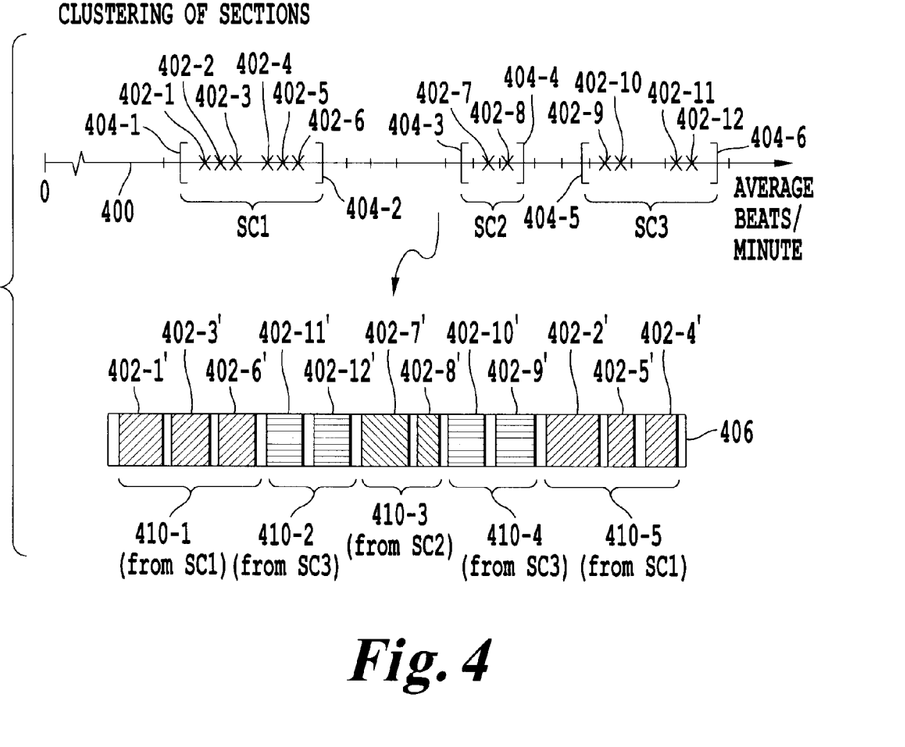
FIG. 4 shows a further embodiment of the invention, wherein a clustering of sections of music pieces is performed, and wherein said sections are arranged with respect to said clustering.

FIG. 4 shows a clustering of sections according to a further embodiment of the invention. In this embodiment, as an example and without limitation to the case, sections are clustered with respect to their average beats per minute. Said average beats per minute are used as a section measure (first measure), represented by a one-dimensional parameter on an axis 400. On axis 400, the respective sections are indicated by crosses 402-1, . . . , 402-12. The clustering of sections into section clusters SC1, SC2, and SC3 is indicated by the square brackets 404-1, . . . , 404-6. A possible result of arranging sections with respect to said clustering is shown in the lower part of FIG. 4 depicting an overview in form of a medley 406, in which processed sections 402-1', . . . , 402-12' are grouped in subsequences 410-1, . . . , 410-5 comprising sections from a same, respective section cluster of section clusters SC1, SC2, SC3. In the example, subsequence 410-1 comprises processed sections 402-1', 402-3' and 402-6' that may have been derived from sections 402-1, 402-3 and 402-6 belonging to section cluster SC1. Accordingly, subsequence 410-2 comprises processed sections derived from sections belonging to section cluster SC3 and so on.

Figure 5:
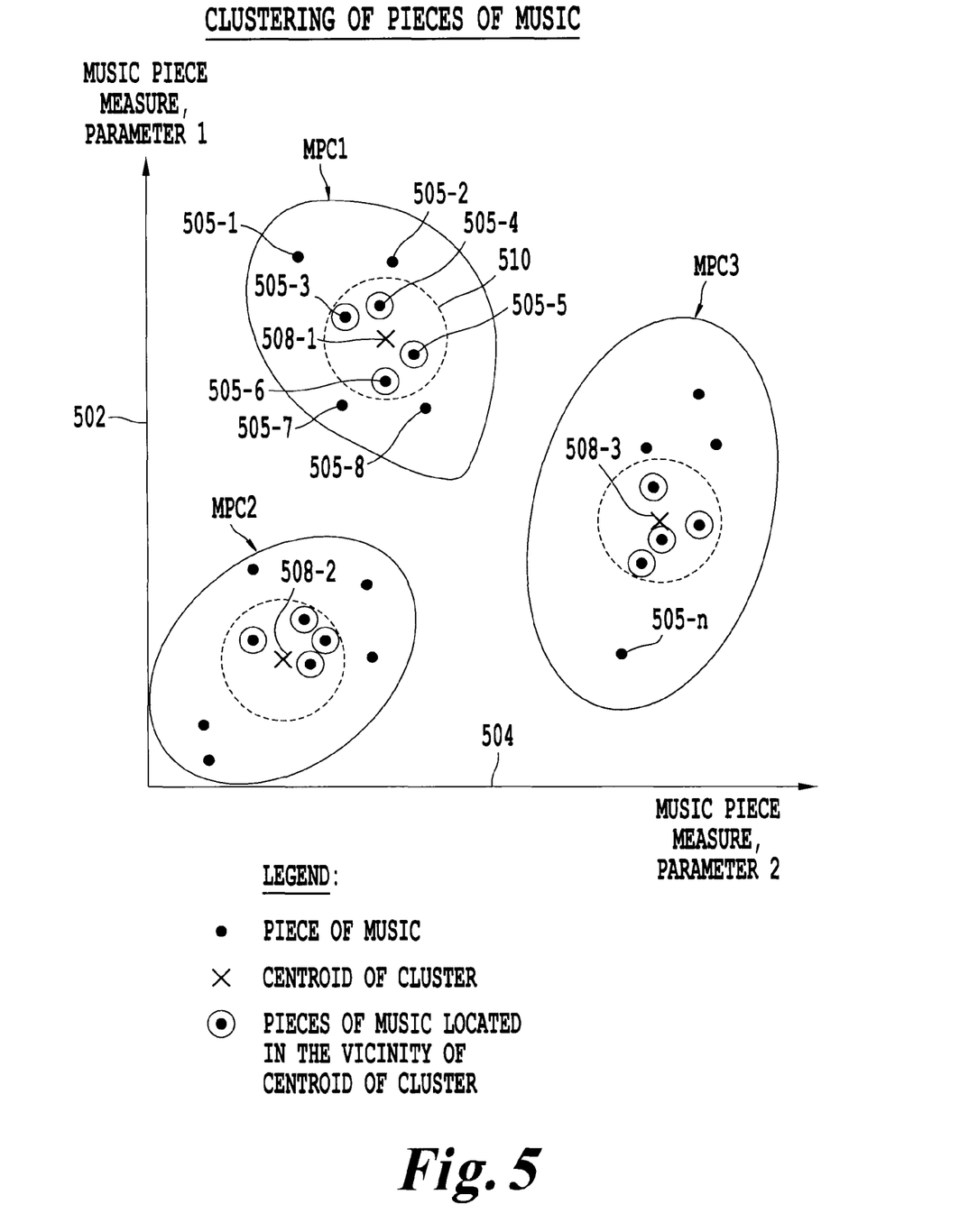
FIG. 5 shows another embodiment of the invention, wherein a clustering of pieces of music is performed, and wherein music pieces located in the vicinity of a centroid of each cluster are identified.

In FIG. 5, the clustering of pieces of music 505-1, . . . , 505-n of a further embodiment of the invention is shown. Said clustering of pieces of music is performed with respect to a music piece measure, in this example comprising two parameters plotted in a two-dimensional coordinate system defined by a first axis 502 and a second axis 504. Pieces of music 505-1, . . . , 505-n are plotted by small points (see also legend on right hand side of FIG. 5). As can be seen, the pieces of music 505-1, . . . , 505-n are assigned to music piece clusters MPC1, MPC2, MPC3. Each music piece cluster MPC1, MPC2, MPC3 has a respective centroid 508-1, 508-2, 508-3 which are depicted as a small cross. Centroids 508-1, 508-2, 508-3 may be considered as centers of a respective music piece cluster, and may be determined as a point to which the sum of displacements of all points in the cluster is zero. For each music piece cluster MPC1, MPC2, MPC3, pieces of music located in the vicinity of a respective centroid 508-1, 508-2, 508-3 are highlighted by a small surrounding circle (again, see also legend of FIG. 5). For example, in music piece cluster MPC1, pieces of music 505-3, 505-4, 505-5, 505-6 may be considered as being located in the vicinity of centroid 508-1 and hence may be considered as representative members of music piece cluster MPC1 with respect to the parameters forming the basis of the music piece clustering. The representative members of a music piece cluster may also be regarded as representative pieces of music.

Determining of representative pieces of music of music piece clusters MPC1, MPC2, MPC3 may comprise determining all members of said music piece clusters with a distance smaller than a predetermined threshold to the respective centroid. As an example, threshold 510 for music piece cluster MPC1 is depicted by a dashed line in FIG. 5. This threshold 510 may be used as a basis for determining the representative pieces of music 505-3, . . . 505-6. Alternatively or in addition, determining representative members of a respective music piece cluster may comprise determining all members belonging to a percentile of a predetermined percentage of pieces of music with smallest distance to the respective centroid.

Moreover, for determining the centroid 508-1, 508-2, 508-3 of a music piece cluster MPC1, MPC2, MPC3, parameters of the music piece measure may be weighted when considering the pieces of music belonging to the cluster, for example by their respective playing time. For example, the respective playing time of pieces of music 505-1, . . . 505-8 may be taken into account when determining centroid 508-1 of music piece cluster MPC1. In this case, this weighting may also have an influence on determination of the representative members of music piece clusters MPC1, MPC2, MPC3.

Determination of representative pieces of music of music piece clusters MPC1, MPC2, MPC3 may influence the section determination step S204. For example, it is possible to only select sections from representative pieces of music, e.g. from the representative pieces of music 505-3, 505-4, 505-5, 505-6 of music piece cluster MPC1 as well as from representative pieces of music of music piece clusters MPC2 and MPC3. Besides, it may be possible to permit the selection of long sections from representative pieces of music and/or to restrict the length of sections from pieces of music that have not been identified as being representative.

Moreover, the identification of representative pieces of music may influence the section arranging step S208 in FIG. 2. Here, sections originating from representative pieces of music may be placed at the beginning of the sequence.

Figure 6:
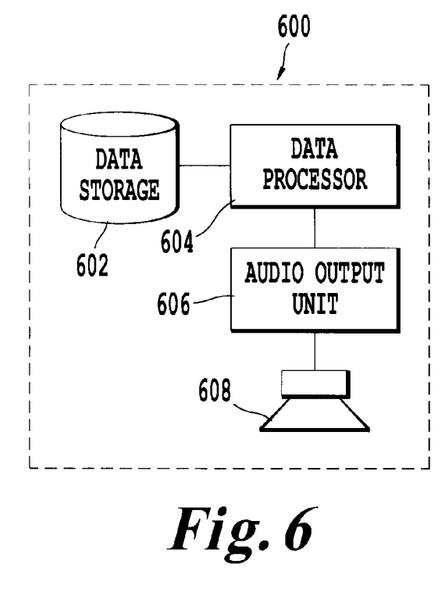
FIG. 6 shows an embodiment of a device for providing an overview of pieces of music.

FIG. 6 shows an embodiment of a device 600 for providing an overview of pieces of music. Device 600 comprises a data storage 602, a data processor 604, an audio output unit 606, and a loud speaker 608.

In this embodiment, music data may be stored in data storage 602. Said music data may be used in device 600 when applying a method for generating an overview of pieces of music, for example in accordance with FIG. 2 in providing step S200. Additionally, data storage 602 may comprise meta-data related to said music data. Said meta-data may also be used when applying said method for generating an overview of pieces of music, for example in music piece clustering step S202 or in section clustering step S206 depicted in FIG. 2. In these steps, meta data may be used as a basis for calculating said music piece measure (second measure) and/or said section measure (first measure). These measures may, for example, be entirely defined by meta data, or, alternatively, only a part of components of a multi-dimensional representation of first and/or second measure may be derived from said meta data. In yet another alternative, meta data may be used as a basis of calculation of said first and/or second measure.

The data processor 604 may be configured to provide pieces of music, e.g. by retrieving music data from data storage 602. Besides, data processor 604 may be responsible for determining sections from said pieces of music, and for arranging said sections in a sequence. Further supporting steps may also be performed by data processor 604, for example the determination of a music piece measure and the clustering of at least some of the pieces of music with respect to that measure. A section measure and a clustering of sections with respect to that section measure may be performed by data processor 604, as well. Determination of said music piece measure and of said section measure may be performed or at least partly supported by retrieving meta-data from the data storage 602. Additionally, data processor 604 may apply a fading procedure to the sequence of sections obtained by the arrangement in order to smoothen the transitions between sections.

The resulting overview or medley may then be stored in data storage 602, or may be transmitted to audio output unit 606. Audio output unit 606 outputs the medley via loud speaker 608.

Device 600 may be a handheld music storage device, a mobile phone or a personal digital assistant (PDA) type device. It may also be a car audio equipment or an audio system e.g. for usage in living rooms or in public places.

Figure 7:
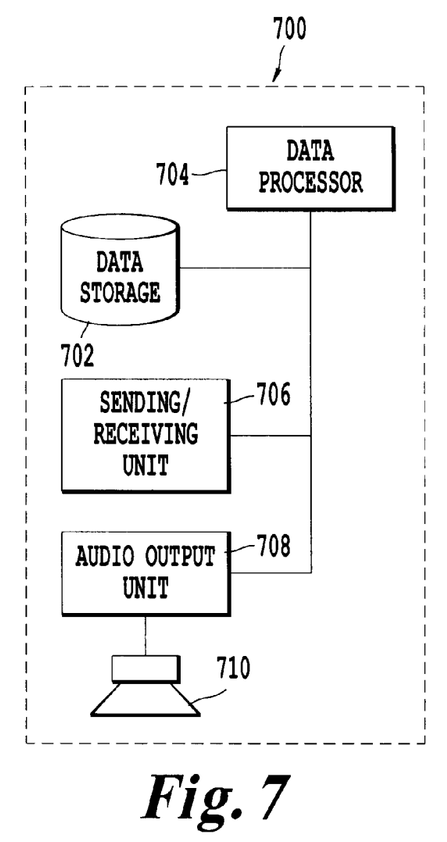
FIG. 7 shows a further embodiment of a device for providing an overview of pieces of music comprising a sending/receiving unit for data exchange.

FIG. 7 shows a further embodiment of a device 700 for providing an overview of pieces of music, comprising a data storage 702, a data processor 704, a sending/receiving unit 706, an audio output unit 708, and a loud speaker 710. Data storage 702, data processor 704, audio output unit 708, and loud speaker 710 may be configured similar or same as data storage 602, data processor 604, audio output unit 606, and loud speaker 608 of FIG. 6. Accordingly, data storage 702 may hold and provide music data and related meta data. Data processor 704 may be responsible for all steps performed in purpose of generating a medley. Audio output unit 708 may then output the medley to a user via loud speaker 710.

The additional sending/receiving unit 706 allows communication of the device 700 with other devices. It may be used for data retrieval from external data sources, such as remotely located data bases. Such data bases may be located in the user's environment, e.g. if the user holds a personal, centralized data storage, or may be accessed via internet. The data retrieved may comprise music data and meta data.

Besides, the sending/receiving unit enables the user to send the generated overview to another device, for example for presenting the medley as a summary of a newly arranged playlist or of a newly acquired compact disc to another person. Provision of the sending/receiving unit 706 may be an option if the device 700 only has a limited data storage 702, and if data exchange via network is desired.

Figure 8:
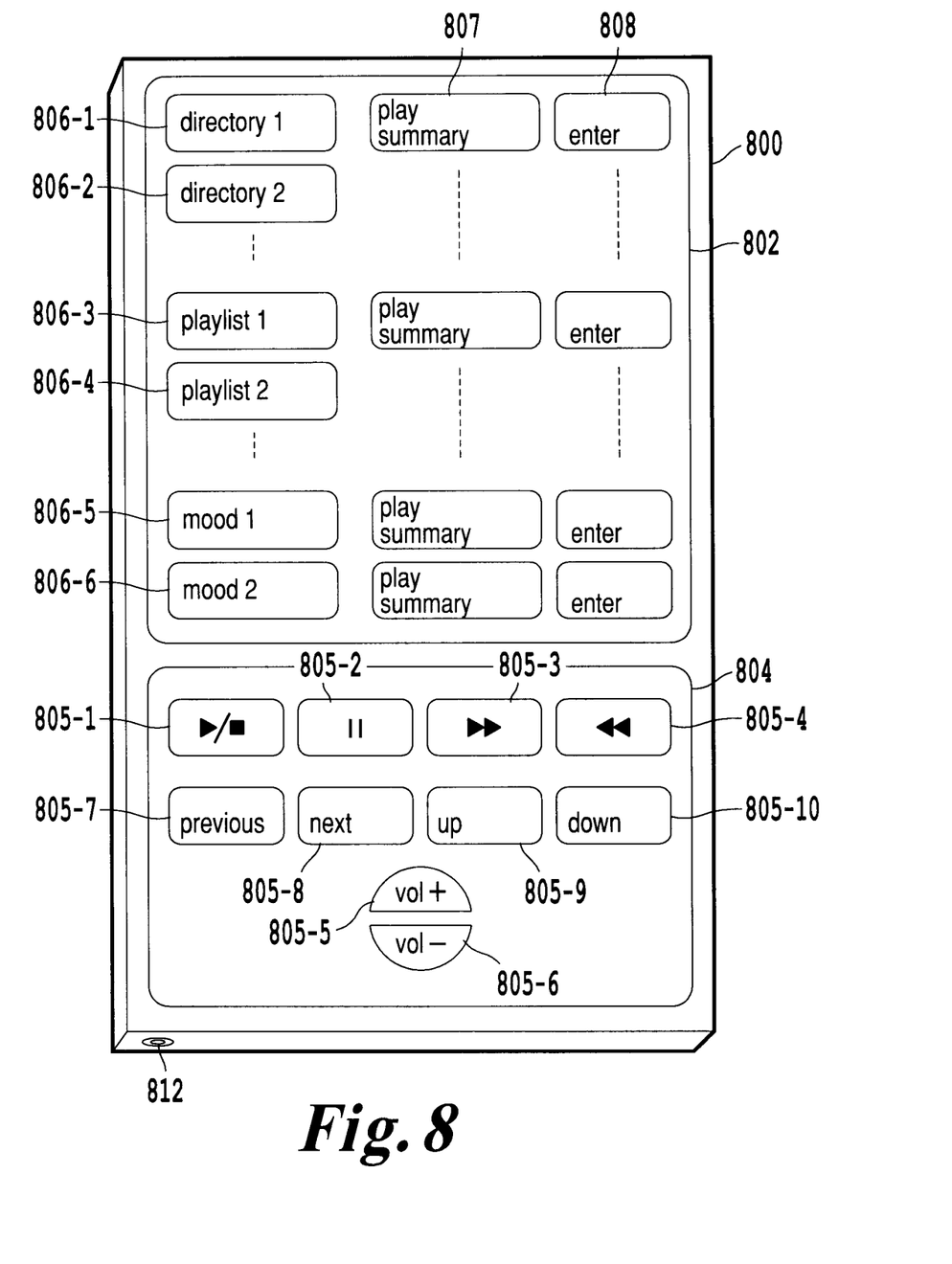
FIG. 8 shows a further embodiment of a device for providing an overview of pieces of music, implemented as a hand-held-device.

FIG. 8 illustrates a potential user interface for providing an overview of pieces of music. A handheld device 800 is shown, offering the user a graphical user interface 802. Graphical user interface 802 may provide a display and touchpad functionality. Additionally, user commands may be entered by a keypad 804, comprising keys for starting and stopping the playback of music data 805-1, for pausing 805-2, and for skipping forward 805-3 and for skipping backward 805-4 in a list of music pieces. Further, keys 805-5 and 805-6 are shown for determining an output volume. When navigating in a folder structure comprising lists of pieces of music, key 805-7 allows returning to the previous item, key 805-8 allows selection of the next item, key 805-9 allows moving one level up and 805 allows moving one level down.

In graphical user interface 802, several directories 806-1, 806-2, playlists 806-3, 806-4 and mood selectors 806-5, 806-6 are shown. Before entering a directory 806-1, the user may select the "play summary"-button 807. Upon selection, a medley of music data of directory 806-1 may be played to the user, e.g. via a head phone or a loud speaker (both not shown in FIG. 8). The user may then decide whether to enter or not to enter the directory. If he/she does not like the summary, he/she may go to the next or previous container, e.g. directory, playlist, or folder, or, if directories are structured in a hierarchical way, he/she may go one level up.

In the example shown in FIG. 8, the option of playing a summary is provided for playlists 806-3, 806-4 and mood selectors 806-5, 806-6, as well. In the latter case, a medley composed of songs of the same mood will be presented.

Accordingly, handheld device 800 enables the user to conveniently browse a music collection, giving him a quick impression of the content of directories, playlists, folders, and/or mood selectors. This may allow the user to decide whether the content meets his tastes/current mood and/or whether a selection might be the right choice.

In a further embodiment, a folder/directory may be a directory of an online music store. If the user likes the medley he/she may be tempted to buy all or at least parts of songs of the folder/directory.

For communicating with other devices such as external data storages or further audio devices, a network access 812 is additionally provided.

Figure 9:
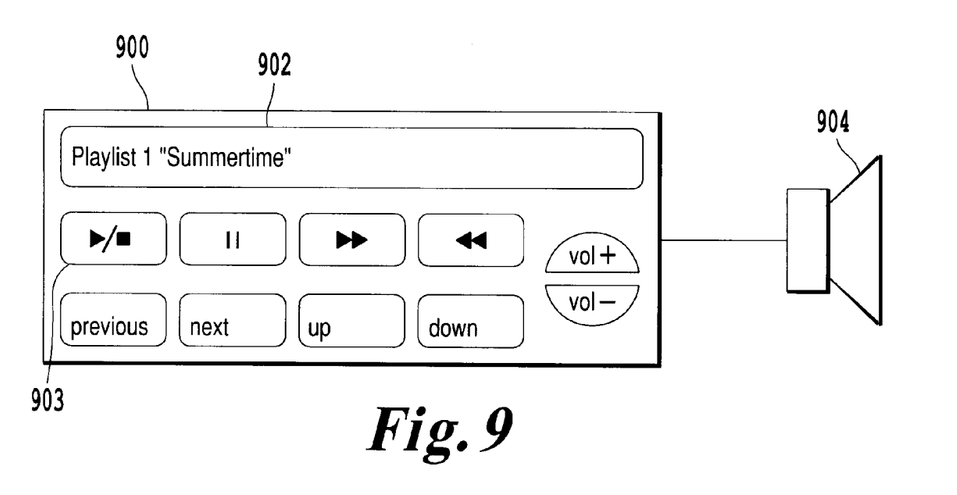
FIG. 9 shows a further embodiment of a device for providing an overview of pieces of music with a restricted graphical user interface.

FIG. 9 shows a further embodiment of a device 900 for providing an overview of pieces of music. Device 900 only allows restricted user interaction: The user interface consists of a small, single row display 902 and a restricted number of keys 903 with predefined functionality. Audio output is supported by a loud speaker 904. Device 900 may be part of car audio equipment.

Browsing large music collections or choosing folders or playlists for listening may be a tedious and painful task for a user in such an environment. If no high resolution graphical interface is available, the limited visual display establishes a need for information exchange via audio signals. A medley generated as a summary of audio data, providing a non-visual overview of the content of a folder or playlist, may be an important piece of information supporting the user in using this device.

Audio systems with restricted user interfaces may be found in cars, where the visual attention of the driver is turned to the surrounding traffic, and where additional distraction of the driver is not acceptable. Another example for audio devices with restricted user interaction are hi-fi systems used in living room environments. Here, usually only a small display, a restricted number of keys, and an additional remote controller with a limited number of buttons is available.

Figure 10:
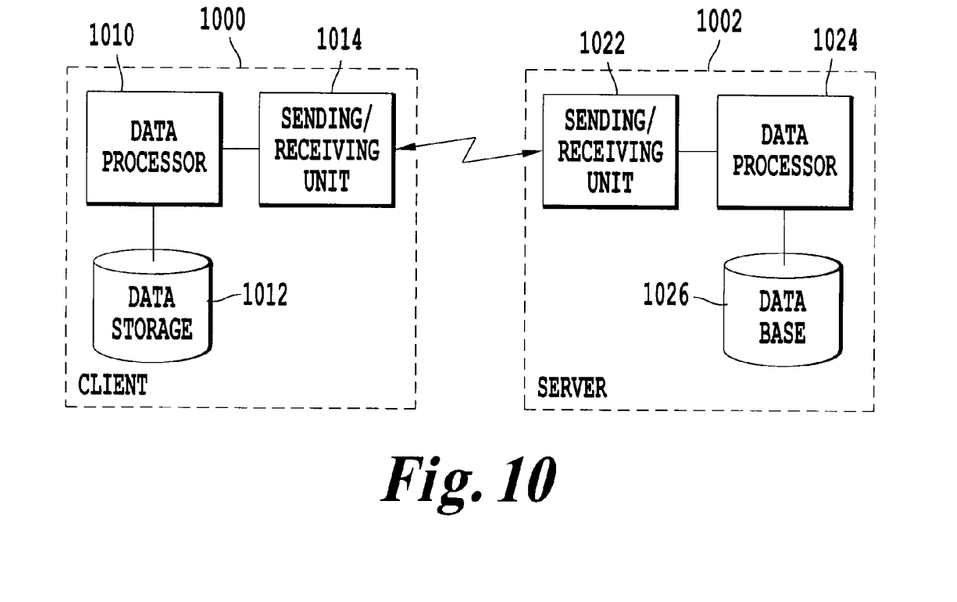
FIG. 10 shows an embodiment of a system for providing an overview of pieces of music, comprising a client and a server, communicating via sending/receiving units.

FIG. 10 shows a further embodiment of the invention comprising a client 1000 and a server 1002. Client 1000 comprises a data processor 1010, a data storage 1012, and a sending receiving unit 1014. Server 1002 comprises a sending/receiving unit 1022, a data processor 1024, and a data base 1026.

Data processor 1010 may be responsible for generating medleys. The music data used as a basis for medley generation may be retrieved from data storage 1012 located at client 1000. Alternatively or in addition, music data may be retrieved from server 1002. For this purpose, client 1000 may send a request for music data, using its sending/receiving unit 1014. This request is accepted by the sending/receiving unit 1022 of the server 1002. It is then processed by data processor 1024, which retrieves the requested data from the data base and sends it back to the client 1000 via the respective sending/receiving units 1022 and 1014. Data processor 1010 of client 1000 may then generate a medley comprising the retrieved music data. If additional information is needed for generating the medley, it may be retrieved from local data storage 1012 or from data base 1026 located on server 1002. This additional information may comprise meta data related to the pieces of music the medley is to be generated of. Said meta data may be pre-calculated/determined automatically or hand-labeled, and may be stored centrally, e.g. in large music data bases that can be accessed via internet. The meta data may then be used e.g. as a basis for determining said first measure in section clustering step S206 and/or said second measure in music piece clustering step S202.

Thus, the client-server-architecture shown in FIG. 10 enables a client to access large music data bases for retrieving music data and/or meta data that may be used for providing an overview of music pieces, e.g. by generating a medley. After having retrieved the data needed, the data processor 1010 of the client 1000 may generate a medley, for example following the steps as described in FIG. 1 or FIG. 2.

Moreover, it may be possible that client 1000 only sends a request for generating a medley to a server 1002. This request may comprise further information on how to generate the medley, e.g. a list of titles of music pieces that shall be incorporated in the medley. This request may be sent by the sending/receiving unit 1014 of the client and may be received by the sending/receiving unit 1022 of the server. The computational burden of generating the medley would in this case be with server 1002. In this case, the steps for generating the medley may be performed by data processor 1024 of server 1002, for example in accordance with the steps depicted in FIG. 1 or FIG. 2. After generation, the medley may be sent by sending/receiving unit 1022 of server 1002 to sending/receiving unit 1014 of client 1000. It may then be played to the user of client 1000, and, if desired, may be stored in the local data storage 1012.

Figure 11:
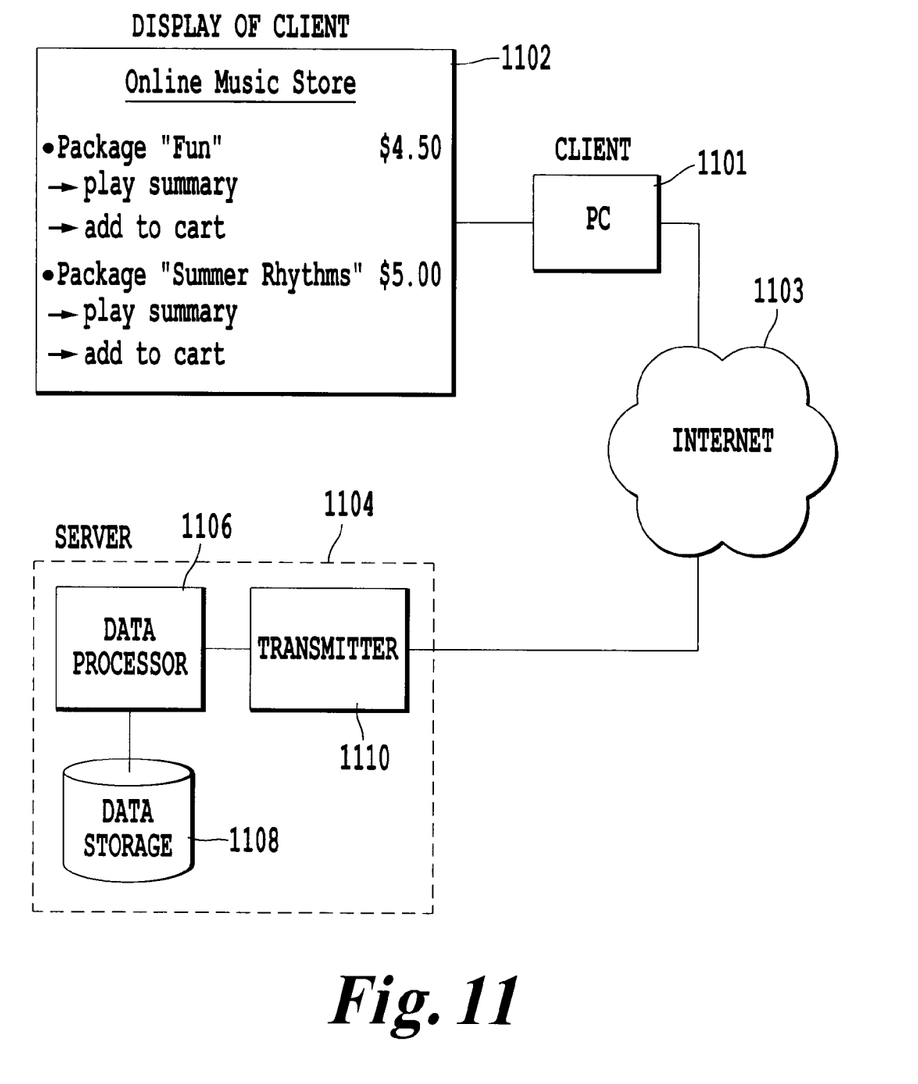
FIG. 11 shows still another embodiment of a system for providing an overview of pieces of music, comprising a client and a server communicating via internet.

FIG. 11 shows a further embodiment of the invention with a client-server-architecture. Here, the client is realized by a personal computer 1101, comprising a display 1102. Via internet 1103, client 1101 is connected to a server 1104 comprising a data processor 1106, a data storage 1108, and a transmitting unit 1110.

In the example depicted in FIG. 11, the server 1104 provides access to an online music store. The display 1102 of client 1101 shows the graphical user interface of this online music store. Here, collections of songs may be offered. Before adding a collection to his shopping cart, a user may request a summary of the package to be played. In doing so, he/she may get a quick impression of the content of the package and may decide whether or not to buy the package. In this example, the summary of each package may consist of an overview of the package generated in accordance with the steps depicted in FIG. 1 or 2.

The above described embodiments may also be used in a method for generating a medley. For example, users might not want to listen to songs of a certain directory/playlist entirely. In this case, the above described principles may be used to generate a medley which can be enjoyed by the user, wherein the medley comprises only parts of songs of the directory/playlist. In other words, the medley comprises the re-arranged sections, e.g. section 308', 306', 310' shown in FIG. 3 or sections 408-1, 408, 2, . . . shown at the bottom part of FIG. 4.

The invention claimed is:

1. A method for providing an overview of pieces of music, comprising:
    providing at least two pieces of music;
    determining at least two sections of said pieces of music, wherein one of said sections is determined from one of said pieces of music and another of said sections is determined from another of said pieces of music;
    arranging said sections in a sequence,
    determining a first measure for said sections, said first measure being descriptive of at least one first property of a respective section,
    arranging said sections depending on said first measure,
    determining a distance between at least two of said sections based on said first measure, and
    arranging a first section of said at least two of said sections and a second section of said at least two of said sections at the beginning of said sequence, said first section and said second section having a highest difference in distance of all of said at least two of said sections.

2. The method according to claim 1, further comprising:
    section clustering said sections,
    dividing said sections into section clusters on the basis of said first measure, and
    arranging said sections in said sequence depending on said section clustering.

3. The method according to claim 2, wherein said sequence comprises at least one subsequence, said subsequence comprising at least two of said sections belonging to a same of said section clusters.

4. The method according to claim 1, further comprising:
    determining a second measure for at least one of said pieces of music, said second measure being descriptive of at least one second property of a respective piece of music,
    music piece clustering said pieces of music,
    dividing said pieces of music into music piece clusters on the basis of said second measure, and
    determining said sections with respect to said music piece clustering.

5. The method according to claim 4, wherein further comprising:
    determining at least one representative section of said sections from a representative piece of music of said pieces of music, said representative piece of music being located in a vicinity of a centroid of a respective music piece cluster.

6. The method according to claim 5, further comprising arranging said at least one representative section at the beginning of said sequence.

7. The method according to claim 4, further comprising:
    determining a size of each of said music piece clusters, and
    allocating the amount of time in said sequence for sections originating from pieces of music of a respective music piece cluster corresponds to its size.

8. The method according to claim 1, wherein said first property and/or said second property are audible properties.

9. The method according to claim 1, wherein said first measure and/or said second measure are determined based on meta data, said meta data being pre-calculated and/or hand-labeled.

10. The method according to claim 1, wherein said sections comprise at least a representative part of the respective piece of music, a chorus, a refrain, and/or a singing voice.

11. The method according to claim 1, further comprising applying a fading procedure to at least one of said sections.

12. The method according to claim 1, further comprising generating or pre-calculating said medley, and
    retrieving said medley from a data storage before playing said medley to a user.

13. A music playback device, comprising:
    a data storage device configured to store at least two pieces of music;
    a data processor configured
        to determine at least two sections of said pieces of music, one of said sections being from one of said pieces of music and another of said sections being from another of said pieces of music, and to arrange said sections in a sequence,
        to determine a first measure for said sections, said first measure being descriptive of at least one first property of a respective section,
        to arrange said sections in the sequence in an order depending on said first measure,
        to determine a distance between at least two of said sections based on said first measure, and
        to arrange a first section of said at least two of said sections and a second section of said at least two of said section at the beginning of said sequence, said first section and said second section having a highest difference in distance of all of said at least two of said sections.

14. The device according to claim 13, further comprising a communications unit configured to receive said at least two pieces of music.

15. The device according to claim 14, wherein
the communications unit is further configured to receive meta data, said meta data being descriptive of at least one property of said pieces of music, and
the data processor is further configured to determine said first measure based on the meta data.

16. A system comprising:
a server comprising a data base comprising pieces of music; and
a client comprising
a communications mechanism configured to receive at least two of said pieces of music of said server;
a data processor configured
to determine at least two sections of said pieces of music, one of said sections being from one of said pieces of music and another of said sections being from another of said pieces of music,
to arrange said sections in a sequence,
to determine a first measure for said sections, said first measure being descriptive of at least one first property of a respective section,
to arrange said sections in the sequence in an order depending on said first measure,
to determine a distance between at least two of said sections based on said first measure, and
to arrange a first section of said at least two of said sections and a second section of said at least two of said section at the beginning of said sequence, said first section and said second section having a highest difference in distance of all of said at least two of said sections.

17. The system according to claim 16, wherein
the data base at the server further comprises meta data being descriptive of at least one property of said pieces of music,
the communications mechanism of the client is further configured to receive said meta data from said server, and
the data processor of the client is further configured to determine said first measure based on said meta data.

18. A system comprising:
a server comprising
a data base configured to store at least two pieces of music
a data processor configured
to determine at least two sections of said pieces of music, one of said sections being from one of said pieces of music and another of said sections being from another of said pieces of music, and to arrange said sections in a sequence,
to determine a first measure for said sections, said first measure being descriptive of at least one first property of a respective section,
to arrange said sections in the sequence in an order depending on said first measure,
to determine a distance between at least two of said sections based on said first measure, and
to arrange a first section of said at least two of said sections and a second section of said at least two of said section at the beginning of said sequence, said first section and said second section having a highest difference in distance of all of said at least two of said sections;
a communications mechanism configured to send said sequence; and
a client comprising a communications mechanism configured to receive said sequence of said server.

19. The system according to claim 18, wherein
the data base of the server further comprises meta data being descriptive of said at least one property of said pieces of music, and
the data processor of the server is further configured to determine said first measure based on said meta data.

20. A non-transitory computer readable medium including computer executable instructions, wherein the instructions, when executed by a processor, cause the processor to perform a method for generating a medley, comprising:
providing at least two pieces of music;
determining at least two sections of said pieces of music, wherein a first section of said sections is determined from one of said pieces of music and a second section of said sections is determined from another of said pieces of music; and
arranging said sections in a sequence,
determining a first measure for said sections, said first measure being descriptive of at least one first property of a respective section,
arranging said sections depending on said first measure, and
determining a distance between at least two of said sections based on said first measure, and
arranging a first section of said at least two of said sections and a second section of said at least two of said sections at the beginning of said sequence, said first section and said second section having a highest difference in distance of all of said at least two of said sections.

* * * * *